Patented July 4, 1950

2,513,312

UNITED STATES PATENT OFFICE 2,513,312

COPOLYMER OF VINYL FLUORIDE AND CHLOROTRIFLUOROETHYLENE

William E. Hanford, Easton, Pa., assignor to E. I. du Pont de Nemours & Company, Wilmington, Del., a corporation of Delaware No Drawing. Application June 8, 1944, Serial No. 539,400

2 Claims. (Cl. 260—87.5)

This invention relates to polymeric materials and more particularly to copolymers obtained from halogenated unsaturated compounds.

This invention has as an object the production of new and useful compositions of matter. A further object is the preparation of valuable high molecular weight polymers comprising chlorotrifluoroethylene and unsaturated fluorine-containing compounds. A still further object resides in a method for preparing these polymers. Other objects will appear hereinafter.

These objects are accomplished by the following invention which comprises polymerizing in the presence of a peroxy catalyst and under superatmospheric pressure a mixture of chlorotrifluoroethylene and another unsaturated fluorine-containing compound containing at least one ethylenic double bond.

The invention is illustrated by the following examples in which the proportions of reactants are given in parts by weight.

Example I

A stainless steel high pressure reactor is swept with nitrogen and charged with 200 parts of deoxygenated water and 0.3 part of benzoyl peroxide. It is then closed, evacuated, and further charged with 60 parts of chlorotrifluoroethylene and 25 parts of vinyl fluoride. The reactor is agitated and heated to 80° C. while maintaining the internal pressure within the range of 2400–2600 lbs./sq. in. by the periodic injection of deoxygenated water. The sum of the pressure drops during 17 hours heating is 9900 lbs./sq. in. The reactor is then cooled, the pressure released, and the product is discharged. The copolymer, when washed and dried, amounts to 66 parts and is found to contain 22.0% chlorine which corresponds to a chlorotrifluoroethylene/vinyl fluoride copolymer containing 72% chlorotrifluoroethylene or a molar ratio of chlorotrifluoroethylene to vinyl fluoride of 1:0.9. It is soluble in acetone. A film of this copolymer sticks to a polished metal surface when heated to about 60–65°. The copolymer can be pressed at 150° C. to obtain films of excellent clarity. These films when heated under tension to maintain constant length pull apart by virtue of their own force of retraction at 110° C.

Example II

A stainless steel high pressure reactor is flushed with oxygen-free nitrogen and charged with 200 parts of deoxygenated water, 0.3 part of ammonium persulfate, 0.075 part of sodium bisulfite and 1.2 parts of borax. The reactor is closed and is further charged with 55 parts of chlorotrifluoroethylene and 45 parts of tetrafluoroethylene. The reactor is agitated and heated to 60° C., while maintaining the internal pressure within the range of 350–400 lbs./sq. in. by the periodic injection of deoxygenated water. After a reaction period of 17.3 hours, the reactor is cooled, the pressure is released and the product is discharged. The copolymer, when washed and dried amounts to 35 parts. The copolymer contains 17.07% chlorine which corresponds to a chlorotrifluoroethylene content of 56% or a molar ratio of chlorotrifluoroethylene to tetrafluoroethylene of 1:1. Colorless transparent film, obtained by pressing the copolymer at 240° C. and 10,000 lbs./sq. in., has a tensile strength of 3870 lbs./sq. in., can be elongated 380%, and has a modulus of elasticity of $0.0675 \times 10^6$ lbs./sq. in. The films are nonflammable and when heated under a tension of 20 lbs./sq. in. pull apart at a temperature of 217° C.

Although the invention is illustrated by the polymerization of chlorotrifluoroethylene with vinyl fluoride and tetrafluoroethylene, it is applicable to the polymerization of chlorotrifluoroethylene with any fluorine-containing unsaturated compound. Examples of other fluorine-containing unsaturated compounds are 1,1-difluoroethylene, trifluoroethylene, 1,1-fluorochloroethylene, 1,1-difluoro-2-chloroethylene, 1,1-difluoro-2,2-dichloroethylene, 1,2-difluoro-1,2-dichloroethylene, bromotrifluoroethylene, and hexafluorocyclobutene. In the preparation of the chlorotrifluoroethylene copolymers of this invention by polymerizing a mixture of chlorotrifluoroethylene with at least one other fluorine-containing unsaturated compound, the proportion of the chlorotrifluoroethylene, based on the total weight of these ingredients can range from 5–95%.

Although the examples illustrate the polymerization of the monomers in the presence of water, it is possible to carry out the reaction in the absence of any diluent. The reaction can also be carried out in the presence of organic solvents instead of or in addition to water.

Catalysts used in the practice of this invention are peroxy compounds, i. e., those compounds which contain a —O—O— linkage. Examples of these compounds are diacyl peroxides, such as benzoyl peroxide, soluble salts of persulfuric acid such as ammonium and potassium persulfate, dialkyl peroxides such as diethyl peroxide, and alkyl hydroperoxides, such as tertiary butyl hydroperoxide.

The process of this invention is generally conducted at temperatures within the range of 40–200° C. The reaction is preferably carried out in the range of 40–150° C. depending upon the catalyst used. Thus, with diacyl peroxides, temperatures ranging from 60–120° C.; with persulfate catalysts, 40–100° C.; and with dialkyl peroxides temperatures of 100–150° C. are generally used.

The process is operative at any pressure above atmospheric up to the pressure that available apparatus will withstand. The rate at which the polymerization takes place is roughly dependent upon the reaction pressure. The pressures used will depend not only upon the nature of the fluorine-containing unsaturated compounds to be copolymerized with chlorotrifluoroethylene, but also upon the molecular weight which is desired in the product and the ease with which the comonomer polymerizes. For example, if a copolymer of high molecular weight is desired, higher pressures are generally used. When a fluorine-containing unsaturated compound which is readily polymerizable, such as tetrafluoroethylene, is to be copolymerized with chlorotrifluoroethylene, lower pressures are generally used. In general, pressures within the range of 300–4000 lbs./sq. in. are used since the best results are obtained when operating within this range.

The products of this invention are adapted to a variety of uses. They may be used in molding plastics, films, foils, fibers, and adhesives and in the coating of wire for purposes of electrical insulation. For many of these purposes the polymer may be combined with or prepared in the presence of plasticizers, stabilizers, fillers, pigments, dyes, softeners, natural resins or other synthetic resins.

As many apparently widely different embodiments of this invention may be made without departing from the spirit and scope thereof, it is to be understood that this invention is not to be limited to the specific embodiment thereof except as defined in the appended claims.

I claim:

1. A composition of matter comprising the copolymerization product of a mixture of chlorotrifluoroethylene and vinyl fluoride, said mixture containing from 5% to 95% chlorotrifluoroethylene based on the weight of the chlorotrifluoroethylene and the vinyl fluoride.

2. A process for obtaining copolymers which comprises heating under superatmospheric pressure at a temperature of from 40° C. to 200° C. and in the presence of a peroxy compound a mixture of chlorotrifluoroethylene and vinyl fluoride, said mixture containing from 5% to 95% chlorotrifluoroethylene based on the weight of the chlorotrifluoroethylene and vinyl fluoride.

WILLIAM E. HANFORD.

REFERENCES CITED

The following references are of record in the file of this patent:

UNITED STATES PATENTS

| Number | Name | Date |
| --- | --- | --- |
| 2,186,917 | Gaylor | Jan. 9, 1940 |
| 2,298,039 | D'Alelio | Oct. 6, 1942 |
| 2,362,960 | Thomas | Nov. 14, 1944 |

FOREIGN PATENTS

| Number | Country | Date |
| --- | --- | --- |
| 110,457 | Australia | May 9, 1940 |
| 677,071 | Germany | June 17, 1939 |
| 796,026 | France | Jan. 17, 1936 |

OTHER REFERENCES

Mellor: "Modern Inorganic Chemistry," pages 352–4, published by Longmans, New York, 1930.